March 30, 1937.   W. JAY   2,075,288
CONTROL MECHANISM FOR STEERING WHEELS
Filed Nov. 13, 1934   2 Sheets-Sheet 1
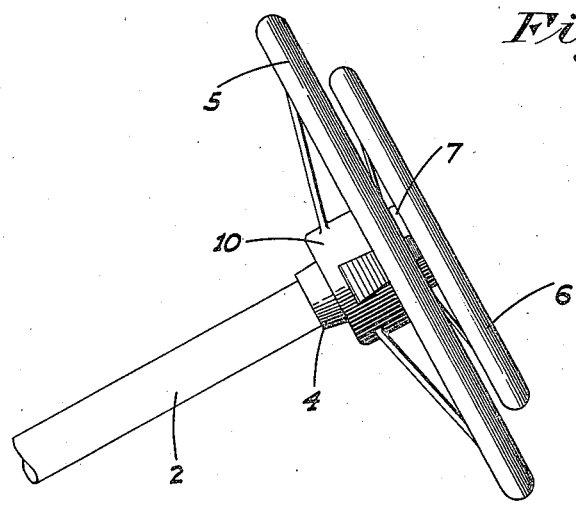
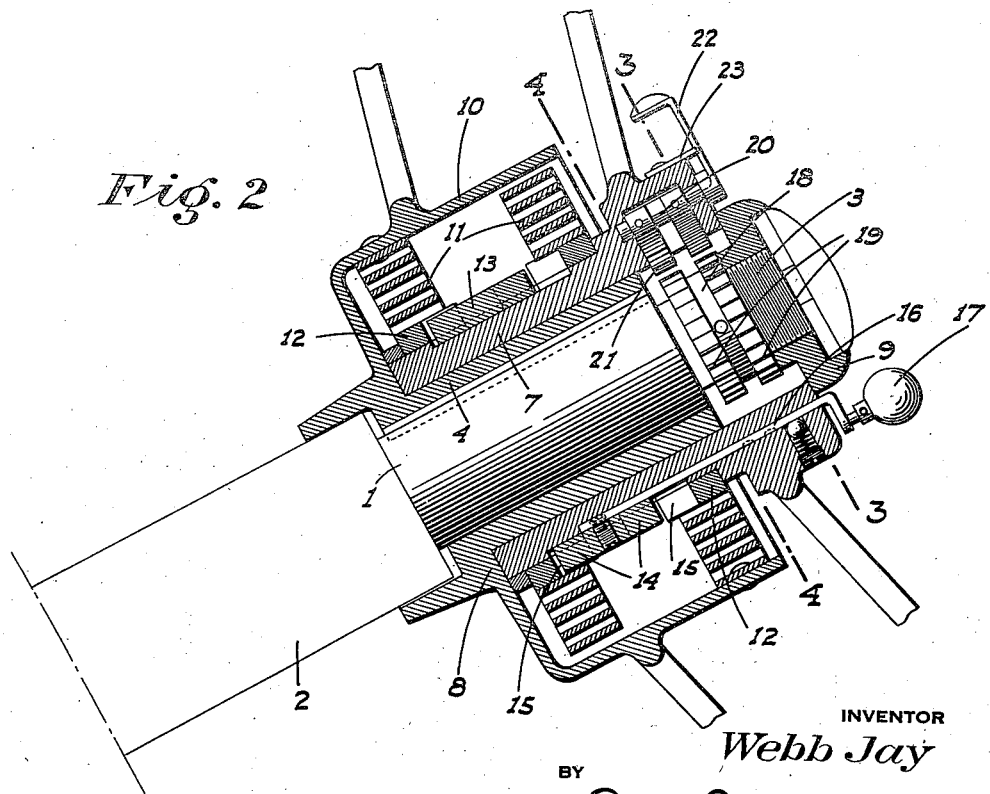
INVENTOR
Webb Jay
BY
ATTORNEY March 30, 1937.                W. JAY                2,075,288
CONTROL MECHANISM FOR STEERING WHEELS
Filed Nov. 13, 1934      2 Sheets-Sheet 2
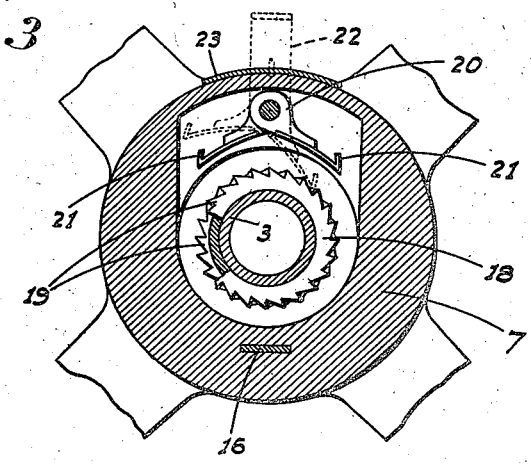
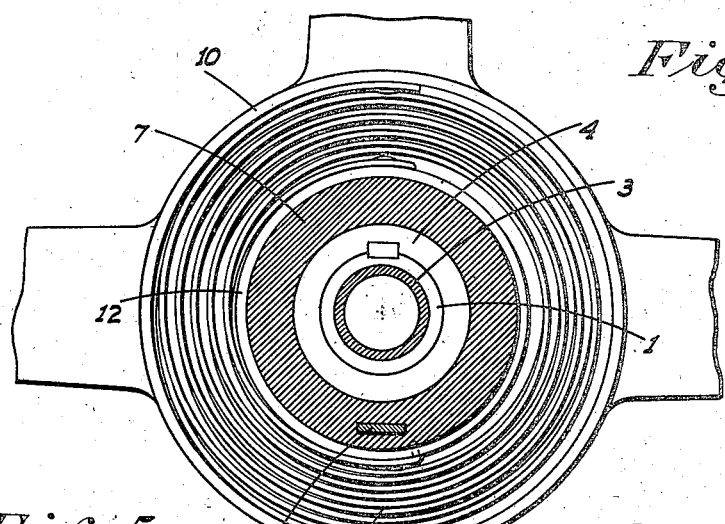
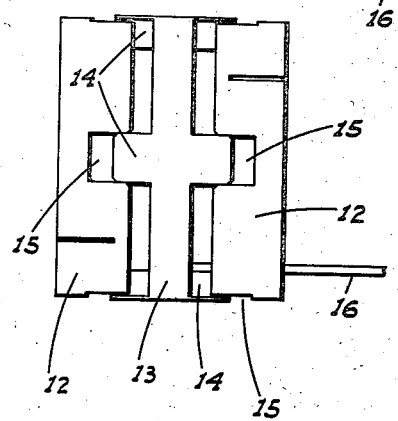
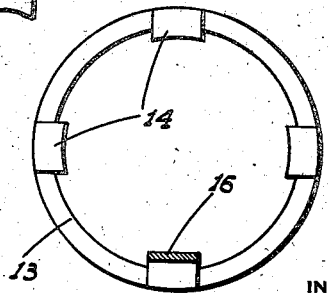
INVENTOR
Webb Jay
BY
ATTORNEY Patented Mar. 30, 1937

2,075,288

UNITED STATES PATENT OFFICE 2,075,288

CONTROL MECHANISM FOR STEERING WHEELS

Webb Jay, Miami Beach, Fla., assignor to May O'Rourke Jay, Miami Beach, Fla.

Application November 13, 1934, Serial No. 752,849

14 Claims. (Cl. 280—87)

This invention relates to steering mechanisms for motor vehicles and particularly to a means to aid in the turning of the steering wheel, as is desirable when handling the car under certain conditions.

When backing a car into the curb, as in parallel parking for instance, or when a heavy truck is being backed against an unloading platform, the wheels must usually be cramped to an extreme position on one side or the other during a portion of this manoeuvre, and this cramping operation must usually be performed when the vehicle is almost if not entirely stationary. Considerable strength must therefore be exerted to turn the steering wheel to the necessary extent and the operation is consequently slowed down considerably.

Also, when rounding sharp curves the steering wheel must similarly be sharply turned to swing the wheels a necessary amount to negotiate the curve.

The principal object of my invention is to provide a manually controlled and selectively operable mechanism whereby the steering wheel may be placed under a tension tending to turn the same in either direction, at any time before the actual necessity for thus turning the wheel arises. In this manner when the wheels of a car must be cramped in a certain direction, the manual exertion necessary to turn the steering wheel to thus swing the wheels is reduced to a minimum. A light touch on the steering wheel is then sufficient to control the desired rotation of the same to the necessary amount, and the driver may better devote his time to the phases of the parking or other manoeuvres.

Also when desiring to turn at a controlled intersection, and while temporarily halted in the line of traffic, a driver may utilize his time in placing the steering wheel under tension to turn the same in the desired direction, so that when the intersection is clear he may give and maintain the necessary direction signal with one hand while easily controlling the turning of the car with the other.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of a steering wheel control mechanism.

Figure 2 is a sectional elevation of the same, substantially full sized.

Figure 3 is a cross section on the line 3—3 of Figure 2.

Figure 4 is a similar view on the line 4—4 of Figure 2.

Figure 5 is a plan view of the spring mounting collar and clutch sleeve unit detached.

Figure 6 is an end view of the clutch sleeve detached.

Referring now more particularly to the characters of reference on the drawings, the numeral 1 denotes the turnable tubular steering post, enclosed for the major portion of its length in a stationary housing 2 and having another stationary post 3 projecting from its upper end, and which in modern motor vehicles is utilized in mounting the horn button, etc. The hub 4 of the conventional steering wheel 5 is as usual fixed on the post 1 above the housing 2.

In mounting my control mechanism in connection with the above standard arrangement of parts I provide an auxiliary relatively small wheel 6 concentric with and preferably somewhat close to but above the wheel 5. The wheel 6 also has a hub 7 which is turnable on the hub 4 and held against longitudinal movement relative thereto between a base plate 8 on the lower end of the hub 4 and a cap 9 mounted on the upper end of the inner post 3.

Formed with the hub 4 and overhanging the hub 7 in spaced and concentric relation thereto is a cup or spring housing 10. Fixed at their outer ends in the cup and wound in opposite directions as shown in Figure 4 are longitudinally spaced spiral springs 11 whose inner ends are fixed on spaced collars 12 turnable on the hub 7.

Splined on the hub 7 between the collars for axial movement along the hub is a clutch sleeve 13 having fingers 14 projecting from its opposite ends to engage slots 15 in the adjacent ends of the collars. The possible movement of the sleeve relative to the length of the fingers is such that while the fingers can disengage the slots of one collar or the other they cannot disengage the slots of both collars simultaneously. Sliding movement of the sleeve is selectively controlled by a member 16 connected to the inner face of said sleeve and slidably projecting through the hub 7 to the outer end of the same, where an actuating knob of suitable form is attached.

It will therefore be seen that if the clutch sleeve is shifted in one direction by manipulation of the member 16, one spring 11 may be wound up (if the steering wheel 5 is held stationary) by rotation of the auxiliary wheel 6 in the proper direction to thus wind said spring, so as to place the steering wheel under tension for rotation when released in the same direction. Since the collar of the other spring is at that time disconnected from the clutch sleeve, it will not be affected by the tensioning of the spring being acted on.

Leaving the clutch sleeve in an intermediate position or so that both collars are engaged by the clutch sleeve practically locks the two wheels together, since the two springs are then held in opposition to each other and they of course resist being rotated in an unwinding direction when they are once slack.

To enable the auxiliary wheel 6 to be rotated to wind up either spring by intermittently applied hand movements without the wheel returning to its original position when the hand pressure is released I provide the following selectively operable means:

Fixed on the projecting portion of the post 3 is a ratch wheel 18 having axially spaced sets of ratchet teeth 19 cut in opposite directions relative to each other. Turnably mounted in the adjacent portion of the hub 7 is a double pawl unit 20, the ends 21 of which are springy and circumferentially spaced, and are shaped and positioned to engage the corresponding ratchet teeth. The pawl unit is disposed so that only one at a time of the elements 21 can engage its ratchet wheel, while the unit may be moved so that both elements 21 clear their respective ratchet wheels. Such movement may be imparted to the unit at the will of the driver by a flexible finger actuating element 22 connected to the pawl unit and disposed on the outside of the hub 7. A positioning quadrant 23 or the like is mounted on the hub and associated with said finger element so that the latter and consequently the pawl unit will remain in any position to which it may be moved.

In operation therefore it will be seen that either of the springs 11 may be tensioned either at the time it is actually wanted or ahead of such time as the driver may foresee, with a lesser effort and under the latter condition with more leisure than is needed or can be taken to actually turn the steering wheel itself. Such tensioning may be carried out to the extent judged necessary by the amount of turning of the steering wheel which will be required, since it will be obvious that a sharp right hand turn for instance will require a greater amount of turning of the steering wheel to negotiate than a curve of greater radius. While the spring is being tensioned one hand is kept on the steering wheel to prevent or control the turning of the steering wheel. When a turn has been once made and the spring is again slack the pawl unit if it has been used must be immediately released so as not to interfere with further steering operations.

If after tensioning the steering wheel the driver should change his mind as to the necessity for the spring, it is only necessary to shift the sleeve 13 by manipulation of the knob 17, to free the corresponding spring collar, without disturbing the auxiliary wheel 6. This of course allows the tensioned spring to unwind. When the wheels 5 and 6 are to remain locked together as will ordinarily be the case for the majority of the time, the element 22 is of course moved to shift the pawl unit to a neutral position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a steering wheel, separate normally slack springs connected at one end to the wheel, one spring when tensioned tending to rotate the wheel in one direction and the other spring when tensioned tending to rotate the wheel in the opposite direction, a single manually controlled element movable to tension the springs mounted in connection with the steering wheel, and means to place said element into engagement with either spring selectively.

2. In combination with a steering wheel, separate oppositely wound and normally slack spiral springs connected at one end to the wheel, and manually controlled means mounted in connection with the wheel for selective engagement with the opposite end of the springs alternately to place the same under tension.

3. In combination with a steering wheel, separate oppositely wound and normally slack spiral springs connected at one end to the wheel, a single hand actuated element mounted axially of the wheel for rotation in either direction, and means to selectively connect the element with the opposite end of either spring.

4. A device as in claim 3, with selectively operable means to hold the element against rotation in one direction or the other.

5. In combination with a steering wheel, an auxiliary wheel having a hub mounted axially of the steering wheel for rotation relative thereto, separate collars turnable on said hub, separate oppositely wound and normally slack spiral springs separately connected at their inner end to the collars and at their outer end to the wheel, and selectively controlled means to alternatively lock the collars to the hub for rotation therewith.

6. In combination with a steering wheel, an auxiliary wheel having a hub mounted axially of the steering wheel for rotation relative thereto, separate collars turnable on said hub, separate oppositely wound and normally slack spiral springs separately connected at their inner end to the collars and at their outer end to the wheel, a clutch sleeve slidably splined on the hub between the collars, means between the collars and sleeve whereby with a movement of the sleeve along the hub in one direction one collar will be locked to the sleeve while the other collar is disengaged from the sleeve and vice versa, and selectively operable means to thus move the sleeve.

7. A device as in claim 5, with additional selectively controlled means to prevent rotation of the auxiliary wheel in one direction or the other.

8. In combination with a steering wheel, an auxiliary wheel having a hub mounted axially of the steering wheel for rotation relative thereto, separate collars turnable on said hub, separate oppositely wound and normally slack spiral springs separately connected at their inner end to the collars and at their outer end to the wheel, and selectively controlled means to alternately lock the collars to the hub for rotation therewith or to lock both collars to the hub.

9. A device as in claim 5, with a ratchet wheel unit having separate oppositely facing rows of ratchet teeth fixed in axial relation to the auxiliary wheel, and pawls mounted on said auxiliary wheel for selective and alternate engagement with the corresponding rows of ratchet teeth.

10. In combination with a steering wheel, an auxiliary wheel having a hub mounted axially of the steering wheel for rotation relative thereto, separate collars turnable on said hub, separate oppositely wound and normally slack spiral springs separately connected at their inner end to the collars and at their outer end to the wheel, a clutch sleeve slidably splined on the hub between the collars, selectively operable means to shift the sleeve along the hub in either direction, and fingers projecting from the opposite ends of the sleeve, the collars having slots in their adjacent ends to receive said fingers; the length of the fingers relative to the length of possible movement of the sleeve being such that said fingers can only move clear of one or the other of the collar slots at a time.

11. In combination with a steering wheel, separate oppositely wound and normally slack spiral springs connected at one end to the wheel, an auxiliary wheel mounted axially of the steering wheel for rotation relative thereto in either direction, and means to selectively connect the auxiliary wheel with the opposite end of either spring or with the said ends of both springs simultaneously.

12. In combination with a steering wheel, separate oppositely wound and normally slack spiral springs connected at one end to the wheel, an auxiliary wheel mounted axially of the steering wheel for rotation relative thereto in either direction, a hub on the auxiliary wheel projecting through the center turns of the springs, elements connected to the hub end of the springs and turnable on the hub, and a manually controlled member to lock either or both of said elements to the hub selectively.

13. In combination with a steering wheel, an auxiliary wheel mounted axially thereof for rotation relative thereto in either direction, separate spiral springs connected at one end to the steering wheel, and selective control means to connect the other end of either spring to the auxiliary wheel; the springs being arranged so that one when connected to the auxiliary wheel will be tensioned by the rotation of said wheel in one direction and the other spring when thus connected will be tensioned by the rotation of the auxiliary wheel in the opposite direction.

14. The combination with a steering wheel of a normally inert tension element associated with the wheel and functioning when under tension to pull the wheel in one direction, a second wheel mounted immediately above the steering wheel, and means interconnecting the element and the second wheel whereby the latter may be operated to place the element under tension.

WEBB JAY.